Oct. 5, 1948.  W. J. ELKS  2,450,422
DYNAMOELECTRIC MACHINE MOUNT
Filed Jan. 12, 1945  2 Sheets-Sheet 1
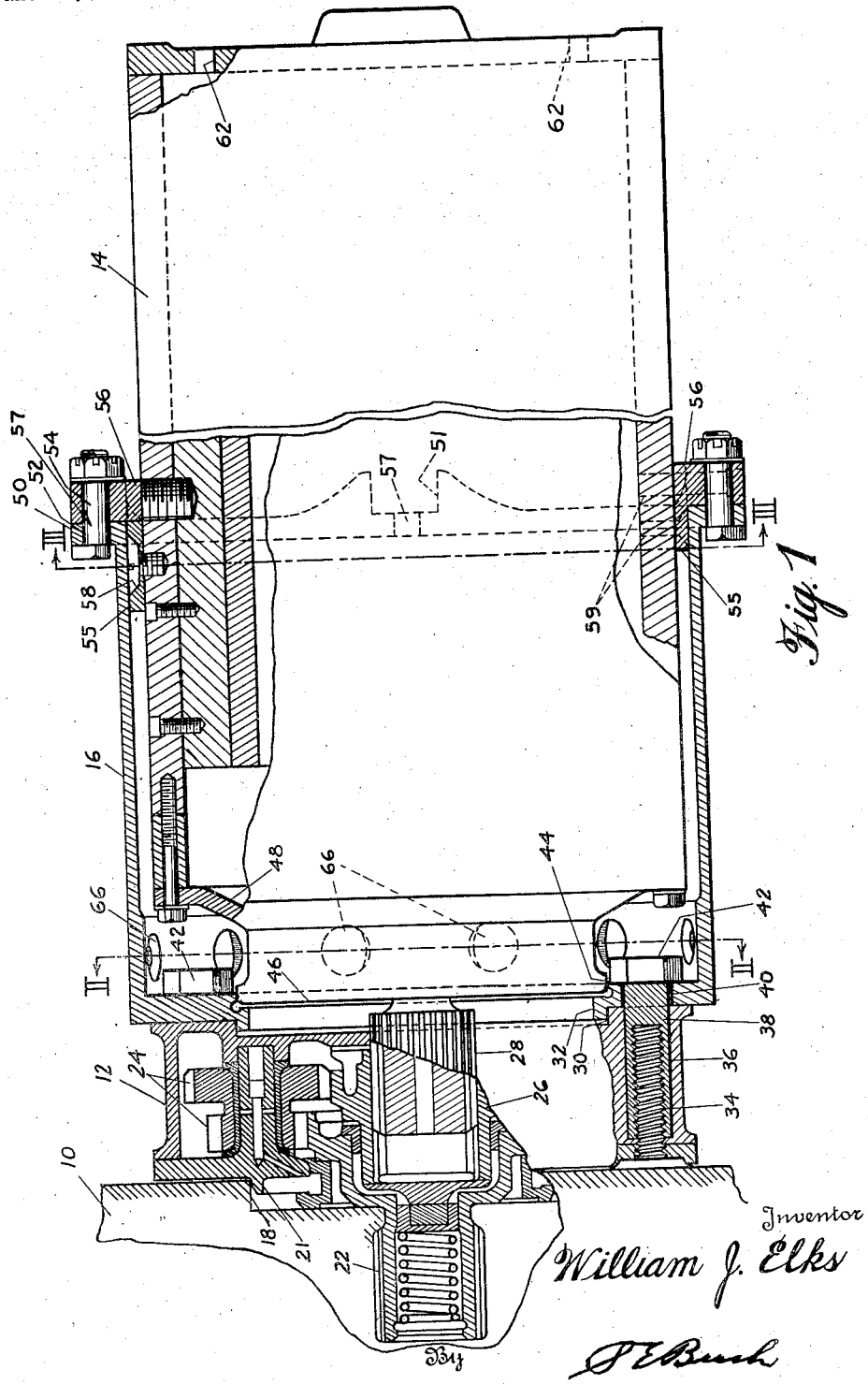
Inventor
William J. Elks
By J. E. Bush
Attorney Oct. 5, 1948. W. J. ELKS 2,450,422
DYNAMOELECTRIC MACHINE MOUNT
Filed Jan. 12, 1945 2 Sheets-Sheet 2

Inventor
William J. Elks
By S. E. Bush
Attorney

Patented Oct. 5, 1948

2,450,422

UNITED STATES PATENT OFFICE 2,450,422

DYNAMOELECTRIC MACHINE MOUNT

William J. Elks, United States Navy

Application January 12, 1945, Serial No. 572,504

8 Claims. (Cl. 171—252)

(Granted under the act of March 3, 1883, as amended April 30, 1928; 370 O. G. 757)

This invention relates to a support and more especially to a device for supporting a unit to be driven in alignment with a driving element.

In instances where a driving element and a driven element in machinery must be in nearly perfect alignment to operate satisfactorily without damage to the elements, frequent dismantling for repair or replacement becomes an arduous, if not an impossible task, especially under the adverse conditions incident to the repair of military equipment in the field. In the present instance, the specific problem is with the alignment of the drive shaft of a generator or starter of a vehicle and the power take-off shaft of the engine to which it is attached, more especially with an airplane engine, although it is equally useful in connection with engine and generator combinations for land and water vehicles.

With this in view, the object of the invention is to provide means to facilitate the alignment of the drive shaft of a generator or starter of an engine, with the power take-off shaft of the engine to which it is attached, in such a manner as to permit rapid dismantling and reassembly of the generator or starter without the use of shims or adjustable elements, which will not add materially to the weight of the equipment and which will be adaptable to existing equipment without undue change therein.

The invention as illustrated herein resides in its broadest aspect, in combination with a driving element and a driven element removably coupled thereto, of means associated with one of said elements and cooperable with the other element to insure alignment of the other element with the one element upon assembly of the other element with the one element, the alignment being insured merely by the assembly of the other element in cooperation with the aforesaid means. More specifically, a sleeve is fixed with respect to the driving element and has internal bearing surfaces concentric with respect to the axis of the driving element, and the unit to be driven has bearing surfaces cooperating with the bearing surfaces in the sleeve, the bearing surfaces of the unit being concentric with the driving shaft so that when the unit is mounted in the sleeve, the driven element and the driving shaft will be in perfect alignment.

In another aspect, invention resides in forming the sleeve of sufficient diameter so that an annular space is left between the unit and the sleeve through which air may be forced to provide cooling, openings being formed in the sleeve adjacent to its closed end thereby to permit the cooling air to be discharged.

The invention will now be described with reference to the accompanying drawings, in which:

Fig. 1 is a longitudinal section through the supporting sleeve which forms the subject matter of the present invention;

Figure 3:
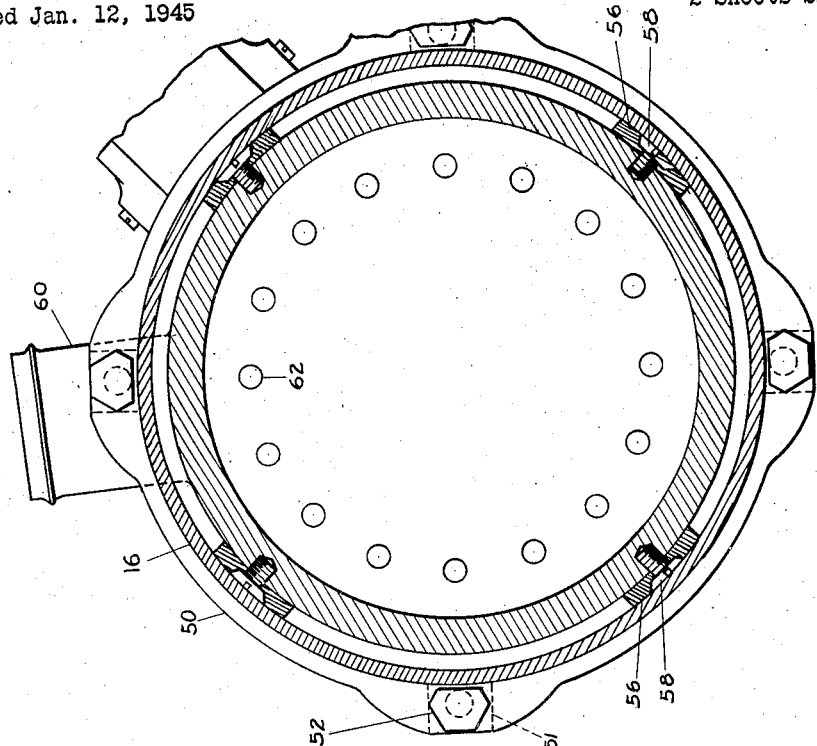
Fig. 3 is a section on the line 3—3 of Fig. 1.

Referring to Fig. 1, there is shown an engine housing 10, a gear housing 12, a generator 14 and a generator supporting sleeve 16, the invention residing in the employment of the supporting sleeve 16 arranged to receive the generator 14 and to hold its drive shaft in alignment with the driving element included in the gear housing 12. As illustrated, the gear housing 12 includes a plurality of gears 24 of such ratios as to furnish the proper speed increase from the engine power take-off to the generator shaft, the gear housing having projecting from its rear face a splined shaft 22 which engages the power take-off (not shown) in the engine, and in its front face, a splined socket 26 driven by the aforesaid gears 24. Heretofore, the gear housing 12 was fixed to the engine housing 10 and the generator 14 was bolted to the gear housing with its drive shaft 28 fitting into the socket 26. Since the generator is heavy, it is difficult to assemble the generator, that is, mount it in place against the face of the gear housing with its drive shaft 28 properly aligned in the socket 26 and to bolt it while so held to the gear case without producing more strain in one direction than another, especially under adverse conditions. Any misalignment of the generator drive shaft 28 and the socket 26, or unequal strain between the two, will frequently result in chewing up the splining on the respective members which causes improper operation of the generator and will ultimately necessitate replacement of these members. To avoid this and to insure perfect alignment between the generator shaft 28 and the socket 26, the sleeve 16 is provided. As illustrated, a recess 18 is formed in the engine housing 10 of a size which is adapted to receive a flange 21 formed on one face of the gear housing 12, the flange being machined so that when it is inserted in the recess 18, the splined member 22 which projects into the engine housing is in alignment with the power take-off in the engine housing. The forward face of the gear housing has machined therein, a recess 30 which is concentric with the axis of the splined socket 26, and which is adapted to receive a forwardly projecting flange 32 formed on one end of the supporting sleeve 16. The flange 32 is machined so that it is concentric with the inner surface of a circular recess 44 formed adjacent to and just inwardly of the flange 32. The recess 44 forms a bearing surface for the reception of an annular flange 46 formed on a cover 48 which is fixed to the end of the generator. This flange 46 is machined so that it is concentric with the axis of the drive shaft 28 of the generator. Hence, when the generator is slipped into the sleeve 16 and the flange 46 is seated in the recess 44, the splined drive shaft 28 will be in alignment with the socket 26, provided the rear part of the generator is also supported centrally of the sleeve. To insure centralization of the rear part of the generator, the inner surface of the sleeve adjacent to its open end is machined so that it is concentric with the axis of the generator drive shaft, and there are fastened to the generator casing, bearing members 55, equally spaced about the periphery of the generator case for engagement with the aforesaid inner surface of the sleeve. The bearing members may be fastened to the casing by screws 58, or may be a part of a lug 56, as illustrated on the lower section of Fig. 1. The bearing members 55 or the generator casing are machined so that when they are secured to the generator case, the surfaces of the bearing members will be concentric with the axis of the generator drive shaft. Hence, when the generator is slipped into the sleeve, that portion of the generator adjacent to the open end of the sleeve 16 will also be held in concentric relation with respect to the axis of the socket. Since there are, as just described, bearing means at both ends of the sleeve for supporting the generator so that the axis of its shaft is in alignment with the axis of the socket, the generator may be mounted in place without difficulty, since by merely slipping it into the sleeve, the bearing surfaces provided automatically align the generator driving shaft with the socket. There is no chance for the generator to get out of line while it is being fastened in place.

Figure 2:
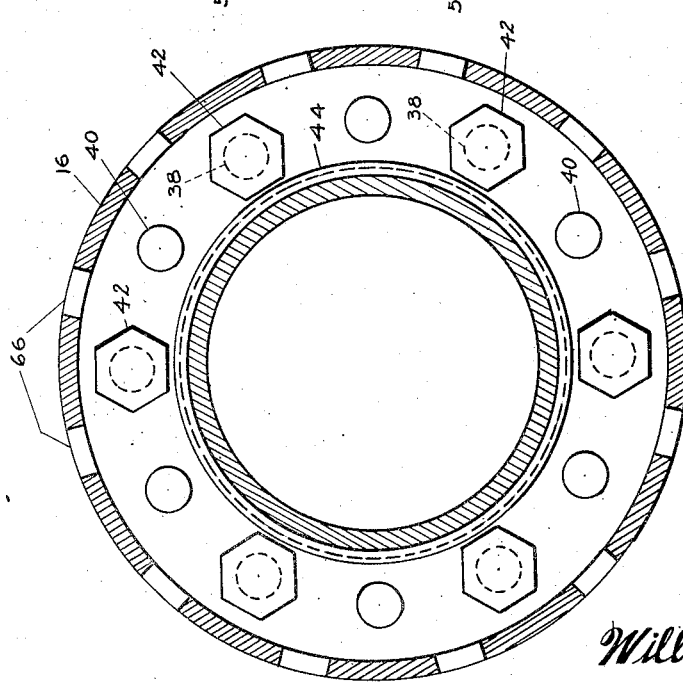
Fig. 2 is a section on the line 2—2 of Fig. 1.

The gear housing and sleeve 16 are bolted to the engine housing as a unit by hollow bolts 38 which are passed through apertures 40 formed in the end of the sleeve next to the gear housing peripherally of the recess 44, and apertures 36 formed in the gear housing, the hollow bolts being screwed onto threaded studs 34 extending from the engine housing. By reference to Fig. 2, it will be observed that the bolts 38 are provided with heads 42 which are hexagonal in shape and of such dimensions from corner to corner that they cannot turn when the flange 46 occupies the recess 44. This eliminates the necessity for cotters, wire, or other securing means for preventing the bolts from becoming loose.

In order to lock the generator in the sleeve 16, the opened end of the sleeve is provided with a radially extending flange 50 which has a plurality of peripherally disposed holes 52 therein for the reception of a corresponding number of bolts 54, the bolts 54 being adapted to pass through apertures 57 in the lugs 56, the latter being threaded into the generator casing, as will be seen by reference to Fig. 1, top section, or may be secured to the generator casing by means of bolts 59, as will be seen by reference to Fig. 1, bottom section. In order to line up the bolt holes 52 with the apertures 57 in the lugs 56 quickly, there is provided in the flange 50, a plurality of recesses 51 opposite each of the holes 52 which are adapted to engage the lugs 56, and when in such engagement, to hold the holes 52 in the flange 50 opposite the apertures 57 in the lugs, and to release the bolts 54 of all torque stress.

When an assembly sleeve 16 of the type described is employed, there is a tendency for the heat produced in the generator to build up to a dangerous point, due to the insulating effect of the sleeve, and hence, it is desirable to provide means for cooling the generator, that is, that portion which extends into and is housed by the sleeve 16. This is taken care of, as will be seen by reference to Fig. 3. Cooling air which is normally forced into the generator through an inlet duct 60, and is exhausted through a plurality of peripherally disposed openings 62 at the ends of the generator, is divided at that end of the generator which extends into and is housed by the sleeve and a portion is exhausted through a plurality of circumferentially disposed openings 66 formed in the sleeve 16 adjacent to the end which is attached to the gear housing 12. Some of the air finds its way directly to the engine housing 10, particularly if no external gears are employed, such as in the housing 12, while still another portion of the air circulates between the generator and the sleeve.

In the initial installation, the gear housing 12 is placed against the engine housing with the bolts 34 extending through the openings 36 and the splined member 22 in engagement with the power take-off in the engine, and thereafter, the generator casing 16 is placed against the exposed end of the gear casing, and the hollow bolts 38 are inserted through the openings 40 and threaded onto the studs 34, a socket wrench being employed for this purpose. As thus assembled, the annular recess 44 of the sleeve 16 is concentric with the axis of the recess 30. With the gear housing 12 and the generator sleeve 16 rigidly secured to the engine housing as thus described, it is evident that when the generator is slipped into the generator sleeve 16 until the flange 46 engages the recess 44 and the bearing members 55 engage the inside walls of the sleeve 16, the generator shaft will be in perfect alignment with the driving socket 26. Since the generator is fastened only by the bolts 54, it is evident that the generator may be assembled and disassembled without disturbing the gear housing and with the assurity that the driving shaft and socket will be in perfect alignment.

The invention described herein may be manufactured and used by or for the Government of the United States of America for governmental purposes without the payment of any royalties thereon or therefor.

What is claimed is:

1. In the combination of a driving element with a driven element removably coupled thereto; means associated with one of said elements and cooperable with the other element to insure alignment of said other element with said one element upon assembly of said other element with said one element, said means including a rigidly fixed frame peripherally spaced from said removable element and having axial and radial aligning surfaces cooperating with corresponding axial and radial surfaces on lugs at spaced intervals about the middle of said removable element, and cooperating peripheral surfaces between said frame and the inner end of said removable element.

2. In the combination of a driving element with a driven element removably coupled thereto; means fixed with respect to the driving element, said means having a recess therein adapted to receive and guide the driven element into its mounted position and having axial and radial aligning surfaces cooperating with corresponding surfaces at spaced intervals about substantially the middle of said removable element, and cooperating peripheral aligning surfaces between said means and the inner end of said removable element.

3. In combination with a driving element, a unit to be driven having a driving shaft adapted to be coupled to the driving element, passages lengthwise thereof and an inlet duct in its side through which air may be forced for cooling the driving element, a sleeve concentrically arranged and fixed with respect to the driving element, said sleeve having an open end adapted to receive and partially enclose the driving element, said sleeve being of sufficient diameter as to leave an annular space between it and the driving element, and having means at circumferentially spaced intervals about the middle of said unit for holding the driving element stator non-rotatably in concentric relation to the driving shaft, said sleeve having passages peripherally disposed near the inner end in communication with said annular space whereupon air forced into the sleeve will discharge through the enclosed end of the unit into the annular space and from thence through the peripherally disposed passages and said annular space to the air.

4. In the combination of a driving or driven element with a driven or driving element removably coupled thereto; means fixed with respect to the driving or driven element, said means having a recess therein adapted slidably to receive and guide the driven or driving element into an aligned mounted position, said driven or driving element and said means having cooperating aligning means close to the driven or driving end of said element, and a second set of cooperating aligning means consisting of a plurality of spacers between the driven or driving element and the means adapted slidably to receive and guide said driven or driving element.

5. In the combination of a driving element with a driven element removably coupled thereto; means fixed with respect to the driving element, said means having a recess therein adapted slidably to receive the driven element, an alignment bearing member arranged concentrically of the axis of rotation about the inner end of said driven element, and a plurality of alignment and supporting bearing members arranged near the center of said driven element.

6. In the combination of a driving element with a unit to be driven removably coupled thereto; a sleeve fixed with respect to the driving element, said sleeve having a recess with an inside diameter slidably to accommodate said unit, the inside surface of said recess being concentric with the axis of rotation of the driving element and having axial and radial aligning surfaces on its inner drive or driven end and a plurality of axial and radial aligning and torque resisting surfaces about the outer end of said sleeve whereby when said unit is slid into said sleeve, said driving element and said unit will be in perfect alignment and said unit will be restricted against rotation in said sleeve.

7. In the combination of a driving element with a unit to be driven, said unit having a driving shaft adapted to be coupled to the driving element; a plurality of bearing surfaces about the middle of said unit concentric with its driving shaft, a sleeve fixed with respect to the driving element, corresponding bearing surfaces internally of said sleeve concentric with the axis of rotation of the driving element and cooperable with the plurality of bearing surfaces on said unit, and cooperable bearing surfaces near the extreme inner end of said sleeve and unit, said bearing surfaces being slidably cooperable to hold the driving shaft and driven shaft in alignment for a short axial displacement when the bearing surfaces are assembled relation when the bearing surfaces are engaged and to allow tilting said unit upon further displacement when the bearing surfaces are disengaged thus allowing removal of said unit in a tilted or off center position to clear any possible adjacent obstructions in front of said unit.

8. In the combination of a driving element with a unit to be driven having a driving shaft adapted to be coupled to the driving element; bearing surfaces on said unit concentric with respect to the driving shaft and spaced along and circumferentially about the axis thereof to provide axially and circumferentially spaced points of support, a sleeve fixed with respect to the driving element having internal bearing surfaces concentric with the driving element, axially and circumferentially spaced to cooperate with the bearing elements on the unit, and means to prevent rotation of said unit in the sleeve, said means being effective before the unit is locked in said sleeve, and means for locking said unit in said sleeve, said locking means consisting of bolts securely attached to unit engaging bolts attached to the sleeve.

WILLIAM J. ELKS.

REFERENCES CITED

The following references are of record in the file of this patent:

UNITED STATES PATENTS

| Number | Name | Date |
|---|---|---|
| 1,245,574 | Dean | Nov. 6, 1917 |
| 1,325,005 | Dean | Dec. 16, 1919 |
| 1,372,045 | Sedgewick | Mar. 22, 1921 |
| 1,616,343 | Asprooth et al. | Feb. 1, 1927 |
| 1,820,985 | McKee | Sept. 1, 1931 |
| 1,979,162 | Lansing | Oct. 30, 1934 |
| 2,099,524 | Klein | Nov. 16, 1937 |